United States Patent
Gilmore

(10) Patent No.: US 6,836,614 B2
(45) Date of Patent: Dec. 28, 2004

(54) ELECTRICAL POWER TOOL HAVING A MOTOR CONTROL CIRCUIT FOR PROVIDING CONTROL OVER THE TORQUE OUTPUT OF THE POWER TOOL

(75) Inventor: Alan A. Gilmore, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/166,805

(22) Filed: Jun. 11, 2002

(65) Prior Publication Data

US 2002/0153856 A1 Oct. 24, 2002

Related U.S. Application Data

(63) Continuation of application No. 08/834,774, filed on Apr. 3, 1997, now Pat. No. 6,424,799, which is a continuation of application No. 08/369,497, filed on Jan. 6, 1995, now abandoned, which is a continuation-in-part of application No. 08/087,932, filed on Jul. 6, 1993, now Pat. No. 5,440,215.

(51) Int. Cl.[7] .............................................. H02P 5/17
(52) U.S. Cl. .................. 388/811; 388/937; 388/930; 388/819; 318/432; 318/434; 318/599; 173/4; 173/5; 173/176; 81/467; 81/469
(58) Field of Search ....................... 318/432, 434, 318/599; 388/809, 811, 819, 815, 907.5, 930, 937, 814; 173/4, 5, 7, 11, 176, 178; 73/862.08; 81/467, 469

(56) References Cited

U.S. PATENT DOCUMENTS

| | | | |
|---|---|---|---|
| 3,564,372 A | 2/1971 | Vogelsberg et al. | |
| 3,668,500 A | 6/1972 | Kosem | |
| 3,673,475 A | 6/1972 | Britton | |
| 3,920,088 A | * 11/1975 | Dudek | 173/169 |
| 4,002,958 A | 1/1977 | Akamatsu | |
| 4,273,198 A | 6/1981 | Doniwa | |
| 4,412,158 A | * 10/1983 | Jefferson et al. | 318/257 |
| 4,447,786 A | 5/1984 | Saar et al. | |
| 4,489,261 A | * 12/1984 | Hartwig et al. | 318/700 |
| 4,522,270 A | * 6/1985 | Kishi | 173/163 |
| 4,873,453 A | * 10/1989 | Schmerda et al. | 307/130 |
| 4,893,067 A | 1/1990 | Bhagwat et al. | |
| 5,011,341 A | * 4/1991 | DeGroff | 408/124 |
| 5,014,793 A | * 5/1991 | Germanton et al. | 173/12 |
| 5,077,824 A | 12/1991 | Nagata et al. | |
| 5,154,242 A | * 10/1992 | Soshin et al. | 173/178 |
| 5,166,585 A | 11/1992 | Koharagi et al. | |
| 5,267,344 A | 11/1993 | Nelson, III | |
| 5,285,857 A | 2/1994 | Shimada | |
| 5,334,923 A | 8/1994 | Lorenz et al. | |
| 5,526,460 A | 6/1996 | DeFrancesco et al. | |
| 6,424,799 B1 | * 7/2002 | Gilmore | 388/811 |

FOREIGN PATENT DOCUMENTS

| | | |
|---|---|---|
| DE | 3230642 | 2/1984 |
| EP | 0291215 | 11/1988 |
| EP | 0340999 | 11/1989 |
| EP | 0680808 | 4/1995 |
| GB | 2269025 | 1/1994 |

* cited by examiner

*Primary Examiner*—Rina Duda
(74) *Attorney, Agent, or Firm*—Harness, Dickey & Pierce P.L.C.

(57) ABSTRACT

A power tool such as an electric drill typically contains a gear train that couples the output spindle of the motor to the tool bit-receiving chuck. The control circuit for the power tool is operable in a ratcheting or pulse mode that causes the output spindle to rotate in discrete incremental amounts. Corresponding methods for controlling the operation of the electric motor of a power tool are also disclosed.

6 Claims, 10 Drawing Sheets

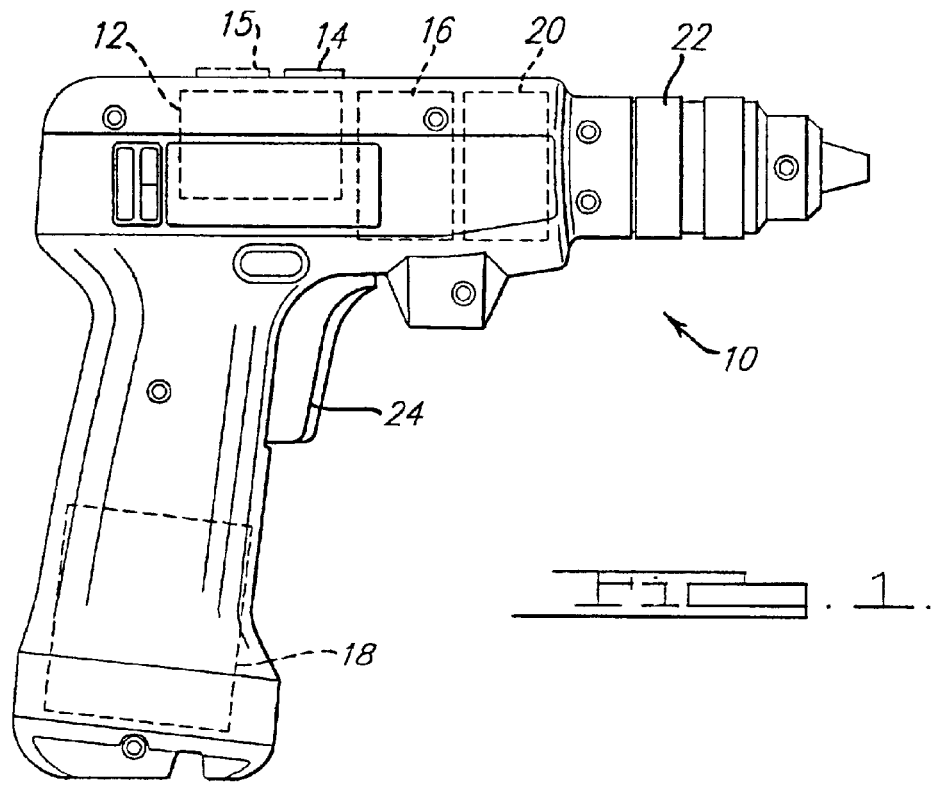
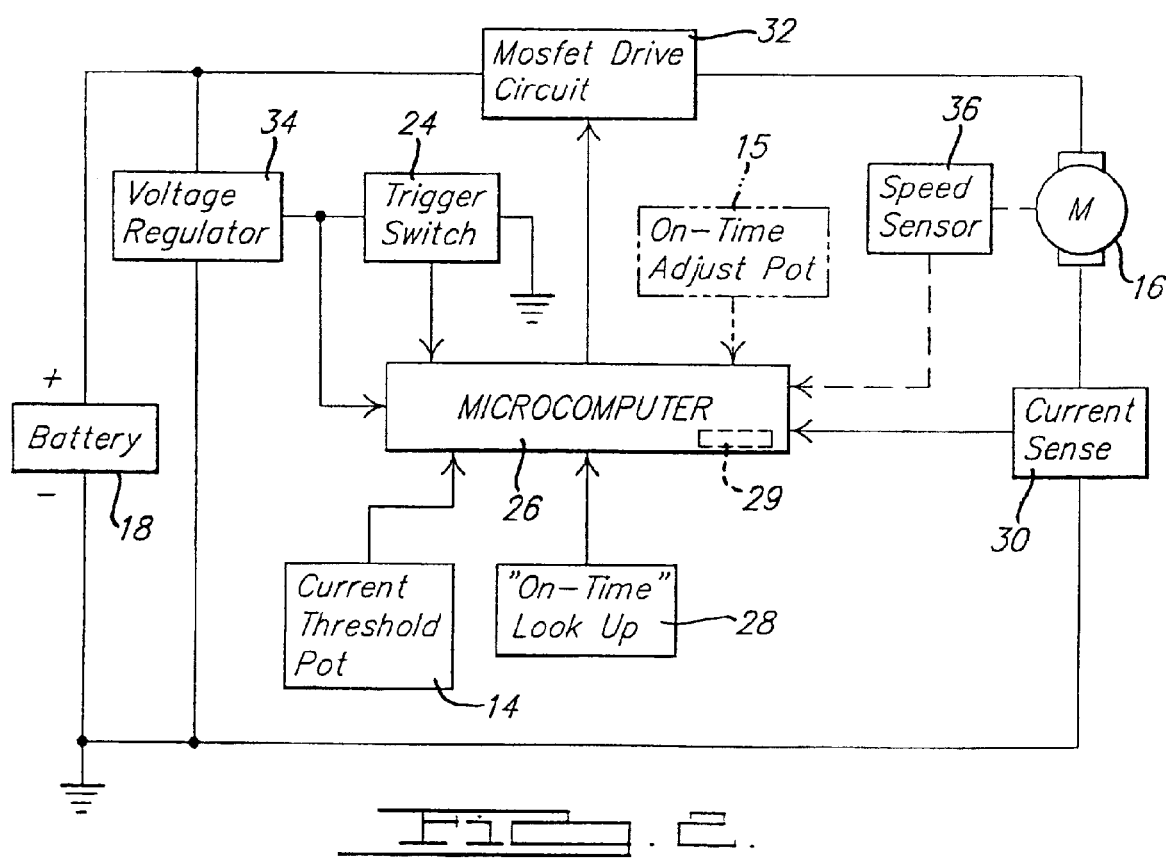

ELECTRICAL POWER TOOL HAVING A MOTOR CONTROL CIRCUIT FOR PROVIDING CONTROL OVER THE TORQUE OUTPUT OF THE POWER TOOL

This application is a continuation of application Ser. No. 08/834,774, filed Apr. 3, 1997 now U.S. Pat. No. 6,424,799, which is a continuation of application Ser. No. 08/369,497, filed Jan. 6, 1995 (now abandoned), which is a continuation-in-part of application Ser. No. 08/087,932, filed Jul. 6, 1993, now U.S. Pat. No. 5,440,215.

TECHNICAL FIELD

This invention relates to electrically driven power tools and, in particular, to a power tool such as a variable speed drill having a motor control that is adapted to increase and better control the effective torque output of the tool.

BACKGROUND OF THE INVENTION

Electrical power tools, such as variable speed drills and power screwdrivers, typically include a motor control circuit that is adapted to control the speed of the output spindle of the tool by controlling the amount of current supplied to the motor. The desired motor speed is usually selected by the operator by varying the position of the trigger switch.

If the power tool is provided with an open loop motor control circuit, the speed of the output spindle of the tool will decrease as the tool is loaded and the current drawn by the motor will increase. Accordingly, if a relatively constant output speed is desired, the operator must manually compensate for the reduction in motor speed as the tool is loaded by further retracting the trigger switch to increase the power applied to the motor. If the power tool is provided with a closed loop motor control circuit, the control circuit is typically designed to automatically increase the amount of power supplied to the motor as the output spindle of the tool is loaded in order to maintain the desired speed.

Thus, when employed in a power screwdriver to drive a screw into a workpiece, for example, the current drawn by the motor will increase as the torque required to drive the screw increases, regardless of whether the control circuit provides open or closed loop control. This operation will continue until either the operator releases the trigger or the motor stalls as the increased torque required to drive the screw exceeds the torque capacity of the tool. Consequently, the effectiveness of many portable power tools, particularly power screw-drivers, is directly related to the tool's maximum torque output capacity. Obviously, the greater the output capacity of the tool, the more useful and versatile the tool. However, in order to significantly increase the torque output capacity of a tool, it is generally regarded as being necessary (assuming changes to the gear train are not an option) to increase the size of the motor and, consequently, the size, weight, and cost of the tool.

Accordingly, it is the primary object of the present invention to provide a portable electrical power tool having a motor speed control circuit that is able to substantially increase the effective torque output of a power tool for a given size motor and gear train.

In addition, it is an object of the present invention to provide a portable electric power tool, such as a power screwdriver having a motor control circuit, that enables the operator to better control the torque output of the tool, which is particularly beneficial when driving a screw into a workpiece.

The motor control circuit employed in the present invention is able to achieve these objectives by intermittently pulsing the motor for predetermined periods of time after a threshold current level is attained. More specifically, it has been found that if power to the motor of a power drill is reduced for a length of time sufficient to allow the gear train coupled to the motor to at least partially "relax", and then power is increased, the motor is able to build up potential energy before the looseness (i.e., backlash) is removed in the gear train. In effect, the motor is afforded a "running start" while the gear train is relaxed. When the backlash in the gear train is removed, the sudden impact of the motor torque on the gear train causes a sudden and high burst of torque to be imparted to the output spindle of the drill, and hence to the driving bit secured thereto. When this pulse control of the motor is repeated, the motor is able to provide a series of bursts of torque to the gear train which in turn can be used to better finish driving a wood screw into and below the surface of a workpiece. The present control scheme thus provides better user control due to the fact that the screw does not rotate too much when static friction is overcome. Rather, with each torque pulse, static friction is overcome and the screw is incremented a fraction of a turn.

While the pulsing operation described above has been found to be particularly helpful and effective when used to drive wood screws and other like implements into a work surface, it has also been found to be an effective means for "breaking loose" a screw or like fastener which is tightly seated in a workpiece, where other forms of power tools such as conventional variable speed drills are unable to do so. By reversing the action of the variable speed drill and applying the pulsing operation described above, the bursts of high torque applied by the motor have been found to be extremely effective in overcoming the high level of stiction force required to initiate removal of such fasteners.

Accordingly, it is a further object of the present invention to provide an electrically driven power tool, such as a variable speed power drill, which incorporates a control circuit for controlling a motor thereof such that the motor can be alternately pulsed fully on and then fully off at a predetermined cycle time during operation of the drill.

It is another object of the present invention to provide an electrically driven power tool having such a control circuit that further provides an operator of the power tool with a means for adjusting the point at which the alternating full-on and full-off operation is initiated.

It is yet another object of the present invention to provide an electrically driven power tool which automatically enters the alternating full-on and full-off mode of operation when the current through the motor exceeds an operator adjustable threshold level setting.

Additionally, it is an alternative object of the present invention to provide an electrically driven power tool that provides the operator with control over the magnitude of the torque bursts during the alternating phase of operation of the tool.

Finally, it is an object of the present invention to provide simplified versions of the present motor control circuit that are suitable for use in relatively low-cost power tools.

SUMMARY OF THE INVENTION

The above and other objects are provided by a portable electric power tool having an electronic control circuit and method in accordance with preferred embodiments of the present invention. The control circuit is preferably disposed within the housing or body of the electrically driven power tool, which is represented illustratively herein as a variable speed power drill. The control circuit generally comprises operator adjustable means for setting a threshold current level which defines a transition point at which alternating on and off operation of the motor is initiated; a trigger switch for selecting the desired speed of the motor; a current sensing circuit for sensing the current flowing through the motor; a switching circuit for controlling the flow of current to the motor; and a controller for comparing the current sensed by the current sensing circuit relative to the threshold current level selected by the operator and controlling the switching circuit to control the amount of current applied to the motor. When the current drawn by the motor exceeds the selected current threshold level, the controller is adapted to temporarily interrupt current flow for a predetermined "off-time" interval, and then reapply a maximum current signal for a predetermined on-time interval, and to alternate this on and off operation until the trigger switch is released.

The off-time interval during which the controller causes the switching circuit to temporarily interrupt current flow to the motor is sufficient to allow the gear train coupled to the motor of the power tool to sufficiently "relax" before maximum current is reapplied to the motor. A value representing this time duration is preferably stored in a memory of the controller and is unique to the gear train of the particular power tool being controlled.

By alternately applying a maximum current signal for a desired time and then interrupting current flow for a predetermined time, the motor of the power tool is caused to generate successive "bursts" of torque to the gear train of the power tool which significantly increases the effective torque output of the power tool. This technique further has been found to be extremely effective in "breaking loose" tightly set wood screws and the like, which other conventionally controlled power tools having comparable-sized motors are unable to achieve.

In several preferred embodiments of the invention, a memory is included for storing a plurality of predetermined "on-times" which the controller accesses depending on the setting of the current threshold level setting means. Thus, on-times of varying duration can be selected by the controller to precisely meet the anticipated conditions of a specific application.

In an alternative preferred embodiment of the present invention, the current comparison performed by the controller is modified in accordance with the changing (i.e., increasing) speed of the motor as the trigger switch is squeezed during operation of the power tool to increase motor speed. In this instance the threshold current level signal selected by the operator is decreased as the speed of the motor increases. With this embodiment a speed sensor is employed to monitor the speed of the motor and provide a signal representative thereof to the controller. As the speed of the motor increases due to progressive engagement of a trigger of the power tool, the controller decrements the operator-selected threshold current level signal. This alternative embodiment further helps to compensate for the inertia of the gear train at higher motor speeds and helps provide even more consistent results independent of the motor speed of the power tool.

In yet another alternative preferred method of operation of the present invention, the transition point for beginning the alternating on and off operation (referred to also as the "ratcheting model" of operation) of the motor is determined in accordance with a predetermined percentage increase in the sensed motor current. With this method the current through the motor is initially measured. After a predetermined time delay, a second current measurement is made. This operation is repeated continuously until the second current measurement exceeds the initial current measurement by a predetermined factor. At that point the controller initiates the alternating on and off operation of the motor. In this embodiment the operator-adjustable threshold current level means is replaced by a means for allowing the operator to adjust the desired on-time of the motor once the ratcheting mode of operation has begun.

This embodiment and method of operation thus provides a method for "automatically" sensing the size of a screw (and thus the torque required to drive the screw) as the operator begins driving the screw into a workpiece, based on the initial current reading. Since the current required to drive a large screw is greater, in the initial stage, than that required for a small screw, setting the transition point in accordance with a predetermined increase in current (e.g., 25% or 50%) automatically serves to adjust the transition point at which the ratcheting mode of operation begins in accordance with the size of the screw being driven.

In yet another alternative preferred mode of operation of the present invention, the transition point is determined by a predetermined drop in motor speed. In this embodiment, the ratcheting mode of operation of the motor is initiated when the motor speed drops below a predetermined speed, or by a predetermined amount (i.e., percentage), or by a predetermined rate.

In a further alternative embodiment, it has been determined to be advantageous to provide the operator with control over the magnitude of the torque bursts during the ratcheting mode of operation. In other words, rather than providing fixed on-time/off-time periods during the ratcheting mode of operation, it may also be desirable to provide the operator with the ability to continue to vary the duty cycle of the voltage signal during the ratcheting mode of operation in accordance with the position of the trigger switch.

In particular, conventional variable speed power tools control the speed of the motor by varying the duty cycle of the voltage signal supplied to the motor. The frequency of the duty cycle signal is set sufficiently high—typically 1 KHz to 12 KHz—so that the motor operates smoothly even though the power is actually being rapidly cycled on and off. The percentage on-time of the duty cycle signal, and hence the average power level, supplied to the motor is controlled by the operator in accordance with the position of the trigger switch.

Consequently, it will be appreciated that the transition from normal variable speed control of the motor to the above-described ratcheting mode of operation can be viewed simply as a change in the frequency of the duty cycle control signal. In other words, the ratcheting mode of operation can be achieved simply by switching from a relatively high frequency control signal to a relatively low frequency control signal (e.g., 10–50 Hz), the period of which is greater than the response time of the motor. Considered in this manner, it is readily apparent that it is possible to continue to provide trigger switch control over the duty cycle of the control signal during the ratcheting or low frequency mode of operation, and thereby provide the operator with the ability to control the magnitude of the torque bursts. This, in turn, provides the operator with greater control when seating a screw into a workpiece.

Lastly, various simplified versions of the present invention are disclosed. In these alternative embodiments, the motor control circuit does not automatically transition between conventional variable speed control and the low frequency pulse mode of operation. Consequently, the more sophisticated microcomputer-based controller, as well as the feedback circuitry for sensing motor current and speed, can be eliminated.

In a first version of this simplified form of the present invention, the power tool is continuously operated in the low frequency pulsing mode. In particular, it has been found that even at a low duty cycle frequency, such as 10 to 50 Hz, the speed of the motor can be varied by varying the duty cycle of the control signal to the motor. Moreover, because the off periods are relatively short (typically less than 10 msec.) at high duty cycle settings, the application of torque from the motor to the output spindle of the tool is relatively smooth. However, as the duty cycle signal is reduced, the off periods between successive pulses increase, thereby producing a more pronounced pulsing operation. This form of motor speed control is thus particularly advantageous when controlling a drill to drive screws. In particular, an operator typically operates a conventional variable speed drill at or near full power (100% duty cycle) during the initial stage of driving a screw and then slows the motor (low duty cycle) during the final stage when the head of the screw is being seated to the proper depth. This technique is therefore readily compatible with the described simplified form of motor speed control as the motor operates in a conventional manner at full power with the pulsing action becoming more apparent at lower duty cycle settings. Thus, the operator is provided with significantly improved control over the depth to which the screw is set. Moreover, despite the relatively low duty cycle settings, the pulsing action produces enhanced bursts of torque which drive the screw in controllable incremental amounts, thereby permitting the operator to accurately set the depth of the screw.

In an additional alternative embodiment of the simplified version of the present invention, a selector switch is provided for enabling the operator to switch between a normal high frequency "drilling" mode of operation and a low frequency "screw driving" mode of operation.

Finally, a further alternative embodiment of the simplified version of the present invention is disclosed that provides a separately adjustable control knob for varying the frequency of the PWM signal. More particularly, the trigger switch in this embodiment functions in a conventional manner to control the duty cycle of the PWM signal. An additional operator actuable knob or dial, preferably located on the top of the drill, is provided for selectively setting the frequency of the PWM signal. Thus, for example, when driving small screws requiring more control, a moderately low frequency (e.g., 50 Hz) can be used which reduces the maximum off time between successive pulses and thereby limits the magnitude of the torque spikes applied to the screw. However, when setting large screws, a lower frequency (e.g., 10 Hz) can be selected which results in sufficiently long off periods to enable the gear train to completely relax, thereby allowing the subsequent build-up of greater potential energy and the application large torque bursts to the screw. Additionally, the operator can simply set the frequency to a normal high PWM frequency level (e.g., 12 KHz) for operation as a conventional variable speed drill.

BRIEF DESCRIPTION OF THE DRAWINGS

The various advantages of the present invention will become apparent to one skilled in the art by reading the following specification and subjoined claims and by referencing the following drawings in which:

FIG. 1 is an elevational side view of a typical variable speed power drill with which the control circuit of the present invention may be used;

FIG. 2 is a simplified block diagram of a preferred embodiment of the control circuit of the present invention;

DETAILED DESCRIPTION OF THE PREFERRED EMBODIMENTS

Figure 3:
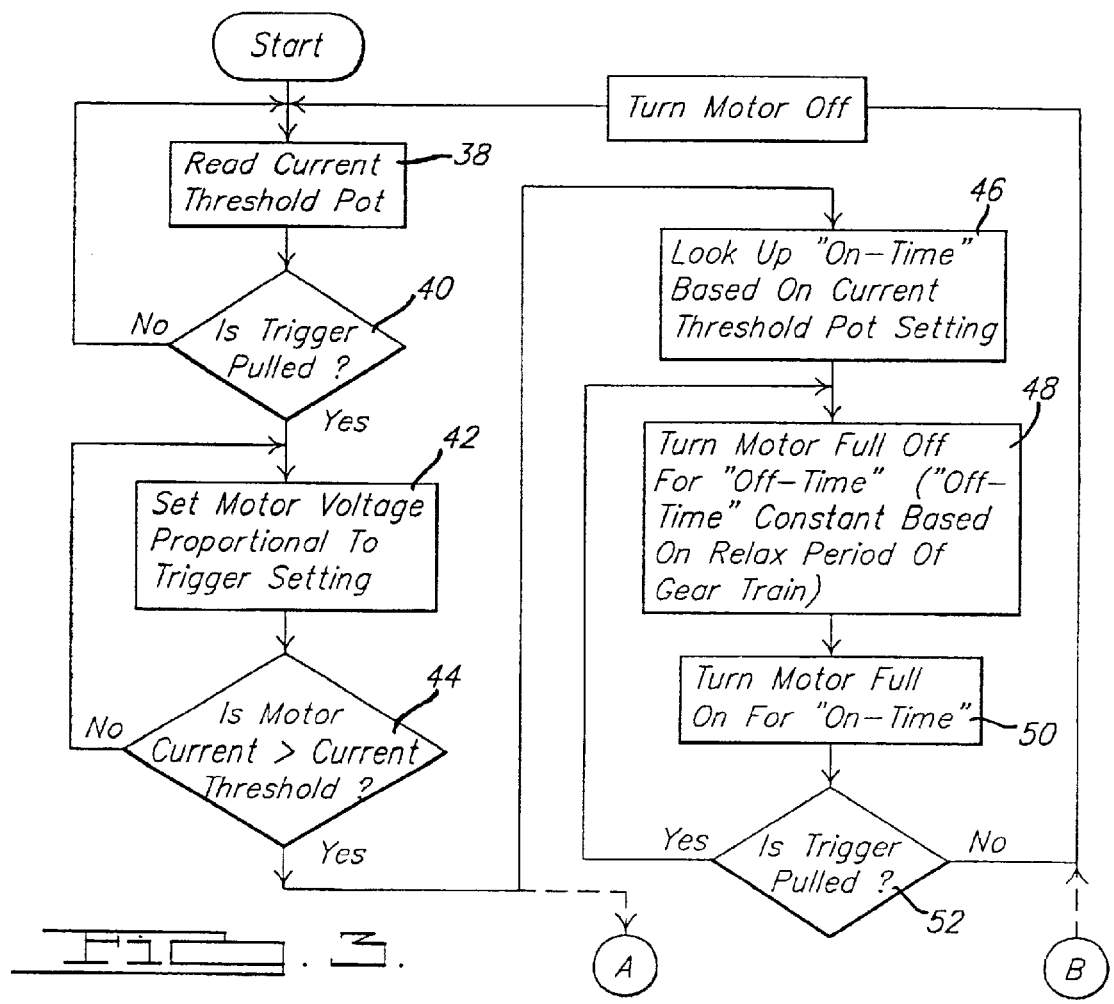
FIG. 3 is a flowchart of the steps of operation performed by the control circuit in implementing the alternating on and off, or "ratcheting" or low frequency, mode of operation.

Referring to FIG. 1, an electrically driven power tool in the form of a cordless (i.e., battery driven) variable speed power drill 10 incorporating an electronic control circuit 12 in accordance with preferred embodiments of the present invention is illustrated. As will readily be appreciated by those skilled in the art, the motor control circuit taught by the present invention is adaptable to other types of electrical power tools, such as power screwdrivers, electric pop rivet guns, and the like. The control circuit 12 includes a current threshold potentiometer 14 which is disposed in a convenient position on the drill 10 to allow an operator to conveniently adjust the potentiometer 14 as needed. The function of this potentiometer 14 will subsequently be described in greater detail.

Optionally included is an on-time adjustment potentiometer 15 which may be used in lieu of potentiometer 14 in an alternative preferred embodiment of the present invention. The on-time potentiometer 15 provides an operator with direct control over the on-time interval implemented during the "ratcheting" mode of operation of the motor 16. It will be appreciated, however, that potentiometers 14 and 15 could easily be used simultaneously to provide the operator with control over the point at which the ratcheting mode of operation begins as well as the duration of the on-time, if such is desired.

The drill 10 includes, in conventional fashion, a motor 16 and a rechargeable battery 18 for powering the motor 16. While the drill 10 has been illustrated as battery powered, it will be appreciated that the control circuit 12 of the present invention could just as easily be used with an A/C powered drill with little or no modification, provided suitable phase control circuitry is included.

The motor 16 of the drill is adapted to drive through a conventional gear train 20, a tool bit-receiving chuck 22. A trigger switch 24 controls the battery voltage across the motor 16 and therefore the current flowing through the motor 16 to provide an operator with the capability of varying the speed of the chuck 22 to suit various work needs.

With reference to FIG. 2, a block diagram of a preferred embodiment of the control circuit 12 is illustrated. The control circuit 12 is used to implement the alternating on and off operation of the motor 16, which will hereafter be referred to as the "ratcheting" mode or low frequency mode of operation.

The control circuit 12 generally includes a controller 26 in the form of a microcomputer, the threshold current level potentiometer 14, a memory device 28 such as a read-only memory (ROM), and a current sensing circuit 30 coupled in series with the motor 16. A switching circuit in the form of a metal oxide silicone field effect transistor (MOSFET) drive circuit 32 is provided for controlling the voltage applied across the motor 16 and thus the current flow through the motor 16, in accordance with the duty cycle of the pulse width modulated ("PWM") control signal received from the microcomputer 26. The on-time adjustment potentiometer 15 is also shown in phantom indicating its presence as being optional.

The controller circuit 12 further includes the trigger switch 24 which provides a signal to the microcomputer 26 in accordance with the degree of retraction thereof by the operator. A DC battery pack 18 and a conventional voltage regulator 34 connected across the battery are provided for supplying a regulated DC voltage across the motor 16 and to the microcomputer 26.

The control circuit 12 may optionally include a speed sensor 36 for sensing the speed of the motor 16 and providing a signal in accordance therewith to the microcomputer 26. The speed sensor 34 may take the form of a variety of well-known speed sensing devices such as optical encoders or Hall-effect sensors which are capable of supplying a series of pulses to the microcomputer 26 which are representative of the frequency of rotation of the motor 16. The use of the speed sensor 34 will be described in greater detail hereinafter in connection with an alternative preferred embodiment of the present invention.

The microcomputer 26 preferably is comprised of an 8-bit microprocessor which includes an on-board memory 29, preferably in the form of read-only memory (ROM), for storing, inter alia, a constant which in the preferred embodiment represents an "off-time" duration sufficient to allow the gear train 20 of the drill 10 to completely relax after current flow to the motor 16 is interrupted. The microcomputer 26 also accesses the memory 28 to read a plurality of values stored in a look-up table therein which represents varying on-time intervals for leaving the motor 16 fully on when the ratcheting mode is implemented. Finally, the microcomputer 26 is responsive to the threshold current level potentiometer 14 to provide an operator with the capability of adjusting the point at which the ratcheting mode of operation is to begin. This point will be referred to hereafter as the "transition" point.

It should be appreciated that the relax time, and thus the desired off-time, will vary from tool to tool depending on the design of the gear train. Accordingly, power tools such as drills having gear trains of differing design will most likely require different off-times to allow their gear trains to completely relax. The off-time for a specific gear train design may be determined by any suitable testing procedure which provides a relatively accurate determination of the time interval required, once torque is removed from the gear train, for the gear train to return to a "relaxed" condition. With the preferred embodiments described herein, an off-time within a range of about 20 ms to 100 ms provides sufficient time for the gear train to completely relax, although this can vary greatly depending upon the particular type of tool.

In addition, it will be appreciated that it is not critical to the present invention that the duration of the off-time period be sufficient to enable the gear train of the power tool to completely relax. In particular, if the off-time period is such that the gear train is allowed to only partially relax, an enhanced torque effect will nonetheless be realized when power is reapplied, but simply to a lesser degree than if the gear train is allowed to completely relax.

Figure 10:
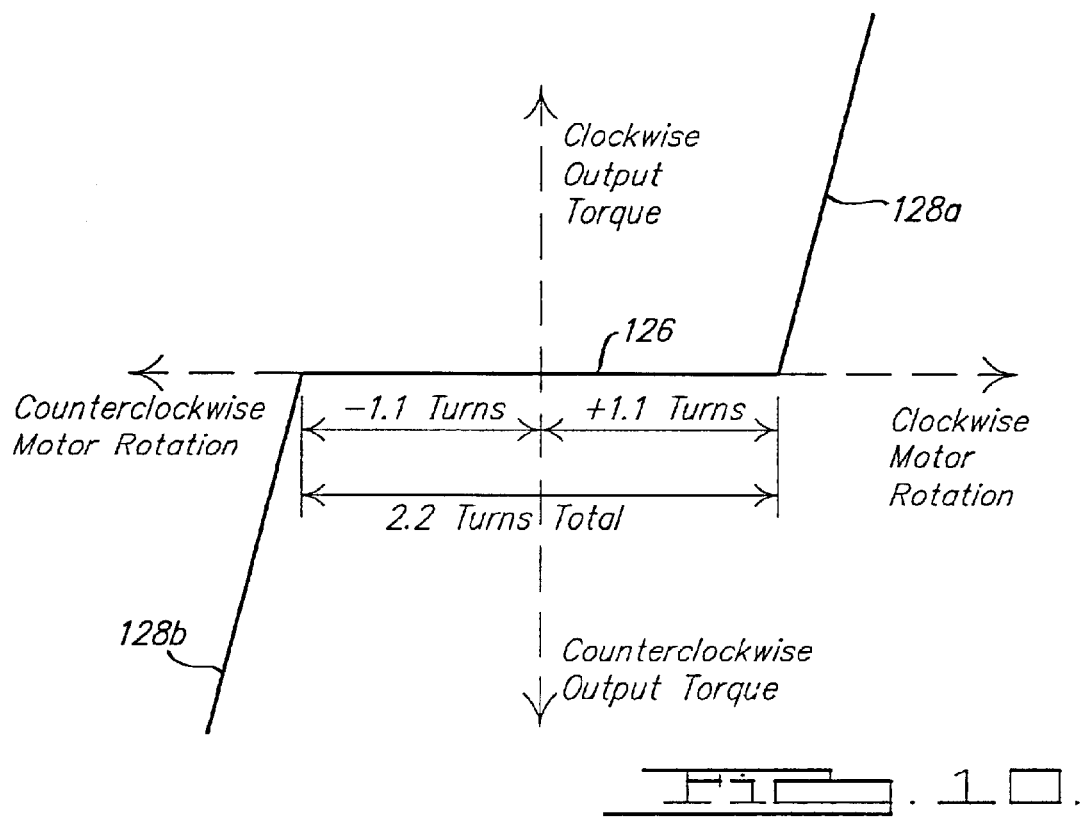
FIG. 10 is a diagram graphically illustrating the relationship between output torque and motor rotation for a typical power drill.

With particular reference to FIG. 10, a graph illustrating the relationship between motor rotation and torque for a typical power tool is shown. The gear train in a commercial power tool, such as a drill, has an inherent "looseness" due to normal manufacturing tolerances, which may allow the tool spindle to be freely rocked back and forth over a given range, typically between 30°–90°. However, due to the gear reduction in the gear train, with the output spindle locked against rotation, the motor armature may be rotatable over a much greater range, typically in excess of two complete revolutions. This is demonstrated by the flat portion 126 of the curve centered around the vertical axis which represents 2.2 complete revolutions of the motor armature. Consequently, when the motor of the tool is initially started there is actually a lag between the point in time when the motor armature begins to rotate and when the tool spindle begins to rotate. In addition, as the tool spindle is loaded and the torque output of the motor increases, the gear train will "tighten" further. This is demonstrated by the rising portions 128a and 128b of the curve.

However, when power to the motor is reduced or interrupted and the torque applied by the motor output shaft drops substantially below the loading on the spindle, the gear train will begin to untighten or "relax". In fact, if the output torque of the motor is permitted to drop substantially to zero, the relaxation of the gear train will actually drive the motor armature in the reverse rotational direction. In other words, the relaxation of the gear train as motor torque collapses will drive the motor in the reverse rotational direction down curve portion 128a, back through zero along flat portion 126, and possibly even slightly down curve portion 128b.

Consequently, it can be appreciated that the greatest enhanced torque effect can be realized by interrupting power to the motor for a period of time sufficient to substantially coincide with the point of maximum reverse rotation of the motor armature. This optimum off-time period can readily be determined empirically for any given tool by connecting a torque transducer to the output spindle of the tool and selectively varying the off time between pulses until the greatest torque peak is achieved. This is due to the fact that further increases in the off-time period beyond the optimum period only serves to unnecessarily delay the reapplication of power and does not further increase the magnitude of the subsequent torque pulse.

However, it will additionally be recognized that there is no single off-time period that is optimum for all conditions under which a particular tool may be used. For example, when using a drill to drive relatively small screws, it may not be desirable to generate large torque pulses that make it difficult to accurately set the screw. Rather, relatively shorter off-time periods and the re-application of less than full power may be preferred in such applications to provide controlled, incremental rotation of the screw enabling accurate final setting of the screw head relative to the surface of the workpiece. In other words, in applications where the maximum torque required to complete the task is less than the torque capacity of the tool (i.e., referred to as the "locked rotor torque"), it may nonetheless be advantageous to operate the tool in the "ratchet mode" for better control. In short, the present invention can be advantageously employed not only in applications requiring enhanced torque output, but also in applications requiring improved torque control. Consequently, when employing the control techniques of the present invention to applications primarily for the purpose of improved torque control, such as the setting of small screws, it is not necessary that the gear train completely relax between pulses or even that the motor torque actually drop to zero between pulses. Rather, the improved control advantages of the present invention can be obtained by controlling the motor in a manner that causes uneven, incremental rotation of the tool output spindle.

Figure 11A:
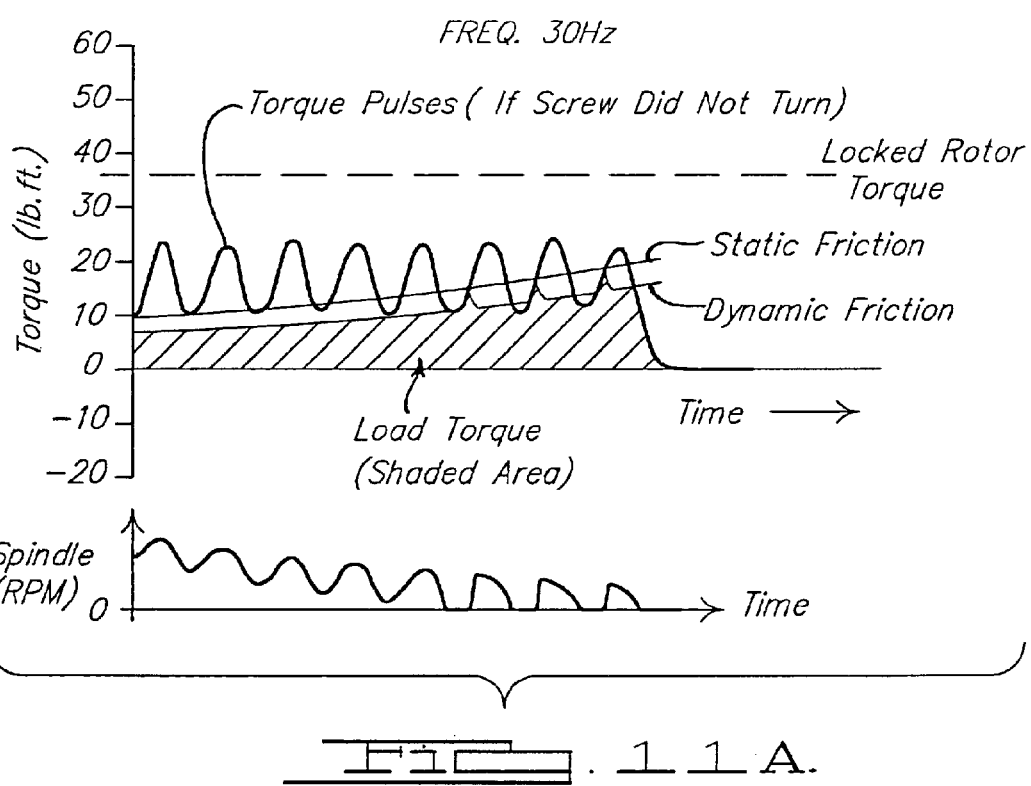
FIGS. 11a–11c are timing diagrams illustrating the operation of the present motor control circuit at various low frequencies.
Figure 11B:
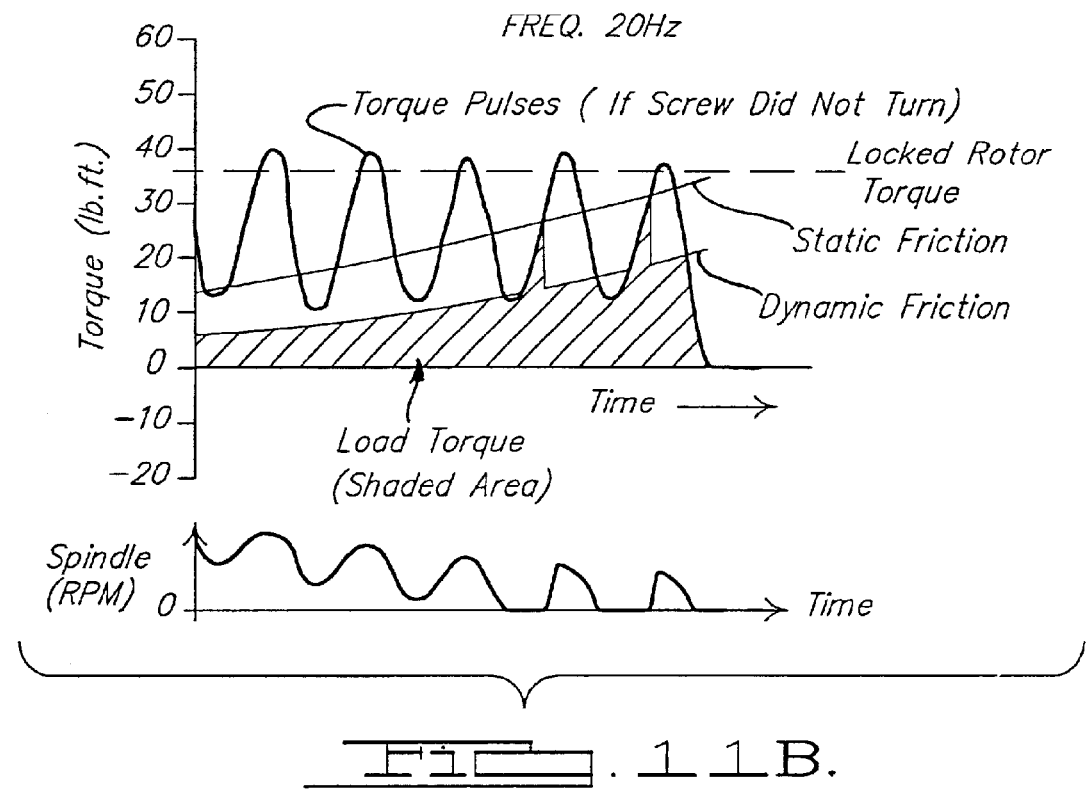
Figure 11C:
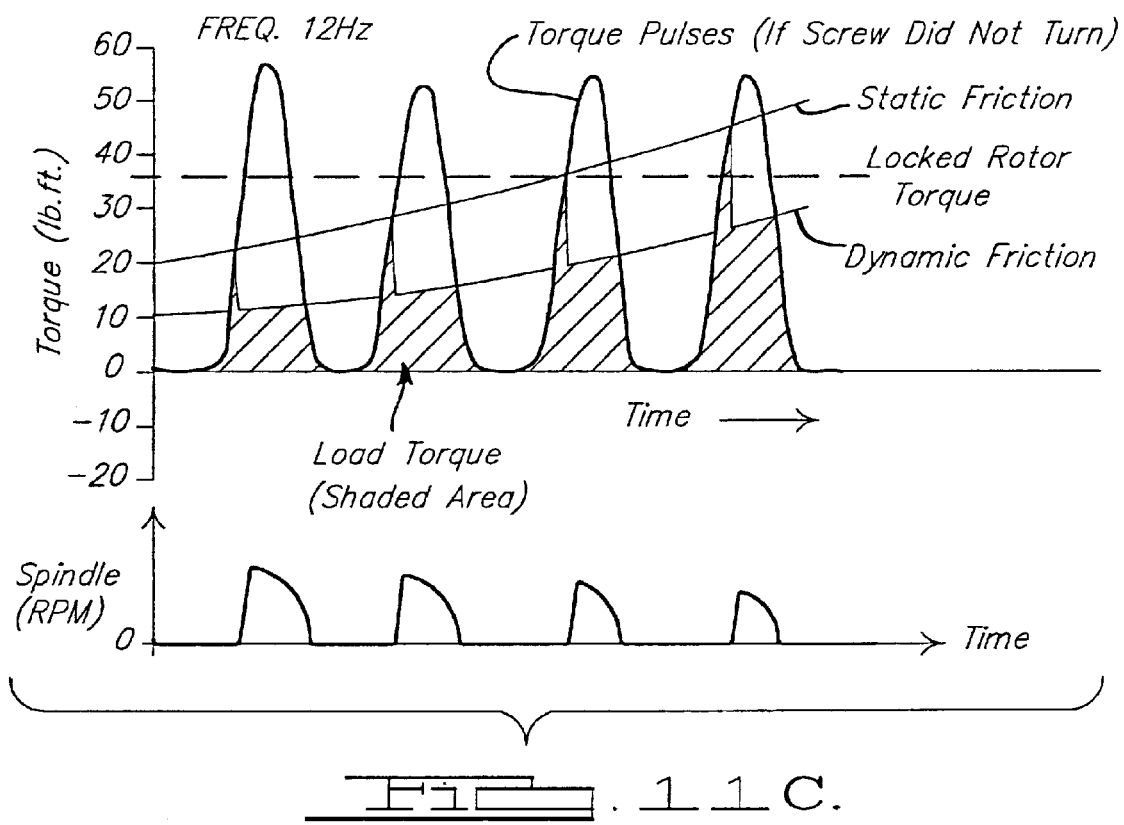

Turning now to FIGS. 11a–11c, a series of exemplary timing diagrams is shown to illustrate the control techniques taught by the present invention as applied to the task of setting different sized screws. FIG. 11a is representative of a suitable control technique for setting a relatively small screw requiring less than the maximum torque capacity of the tool. Note that due to the limited torque requirements of this application, it is not necessary that the torque output of the motor actually drop to zero between pulses. Rather, the reduction in motor torque below the loading on the tool spindle (i.e., the dynamic friction level) is sufficient to substantially reduce and even temporarily halt the rotation of the output spindle of the tool. The subsequent momentary increase in power output above the static friction level thus serves to incrementally rotate the output spindle. This repetitive pulsing of the motor continues until the operator releases the trigger. Consequently, the operator is readily able to accurately control the final setting of the screw.

FIG. 11b is representative of a control scheme for setting a larger screw requiring the application of torque nearer to the capacity of the tool. In this application, power to the motor is sufficiently reduced between pulses for the torque output of the motor to drop closer to zero. Consequently, a degree of gear train relaxation is achieved, enabling the subsequent generation of enhanced torque pulses to incrementally drive the screw until properly set.

Lastly, FIG. 11c is representative of a control scheme suitable for setting a very large screw that is otherwise beyond the capacity of the particular tool. In this instance, the pulsing mode utilizes off-time periods of sufficient duration to enable the gear train to completely relax to maximize the magnitude of the subsequent torque pulses and successfully complete the setting of the screw.

With reference to FIG. 3, a description of the operation of a preferred embodiment of the control circuit 12 will now be provided. Initially, the microcomputer 26 reads the current threshold level selected by the operator via the current threshold potentiometer 14, as indicated at step 38, and waits for the operator to activate the trigger switch, as indicated at step 40.

If the test at step 40 proves true, the microcomputer 26 controls the MOSFET drive circuit 32 to provide a voltage signal across the motor 16 which is proportional to the degree of engagement of the trigger 24, as indicated at step 42. The microcomputer 26 then reads the output from the current sensing circuit 30 to determine if the motor current is greater than the current threshold signal provided by the current threshold potentiometer 14, as indicated at step 44. If this test proves false, then steps 42 and 44 are repeated until step 44 proves true.

When the test at step 44 proves true, the microcomputer 26 accesses the look-up table stored in the memory 28, as indicated at step 46, to obtain the appropriate on-time to be used during the ratcheting mode of operation. The microcomputer 26 then causes the MOSFET drive circuit 32 to interrupt current flow to the motor 16 for the predetermined off-time, as indicated at step 48. When the off-time interval has expired, the microcomputer 26 causes the MOSFET drive circuit 32 to reapply a maximum current flow to the motor 16 for the predetermined on-time interval, as indicated at step 50. As discussed previously herein, the off-time interval is preferably of a duration sufficient to allow the gear train 20 to completely relax.

When the on-time interval has expired, the microcomputer 26 again checks to determine if the trigger 24 is still engaged, as indicated at step 52. If this test proves true, then steps 48–52 are repeated until the test at step 52 proves false. When the test at step 52 proves false, indicating that the work operation is complete, the power to the motor is disconnected and the program returns to the start.

In certain of the preferred embodiments of the present invention, the maximum current signal is a current signal which is sufficiently large to drive the motor at or near its maximum rated speed. This current signal is further applied and removed in a rapid, pulse-like fashion such that the motor 16 "sees" virtually instantaneous "turn-on" and "turn-off" signals.

Optionally, a plurality of varying on-times may be stored in the memory 28 to enable the length of time during which the maximum current signal is applied to be correlated more precisely to the setting of the current threshold potentiometer 14. For example, if the transition point is set to occur at about 80% of maximum rated current flow, then a shorter on-time may be desirable than that required if the transition point is set to 90% of maximum rated current flow. Thus, by varying the on-time interval in accordance with the current threshold potentiometer 14, the duration of the on-time can be chosen by the microcomputer to maximize the torque producing capability of the motor 16 to suit the needs of specific applications.

Figure 4:
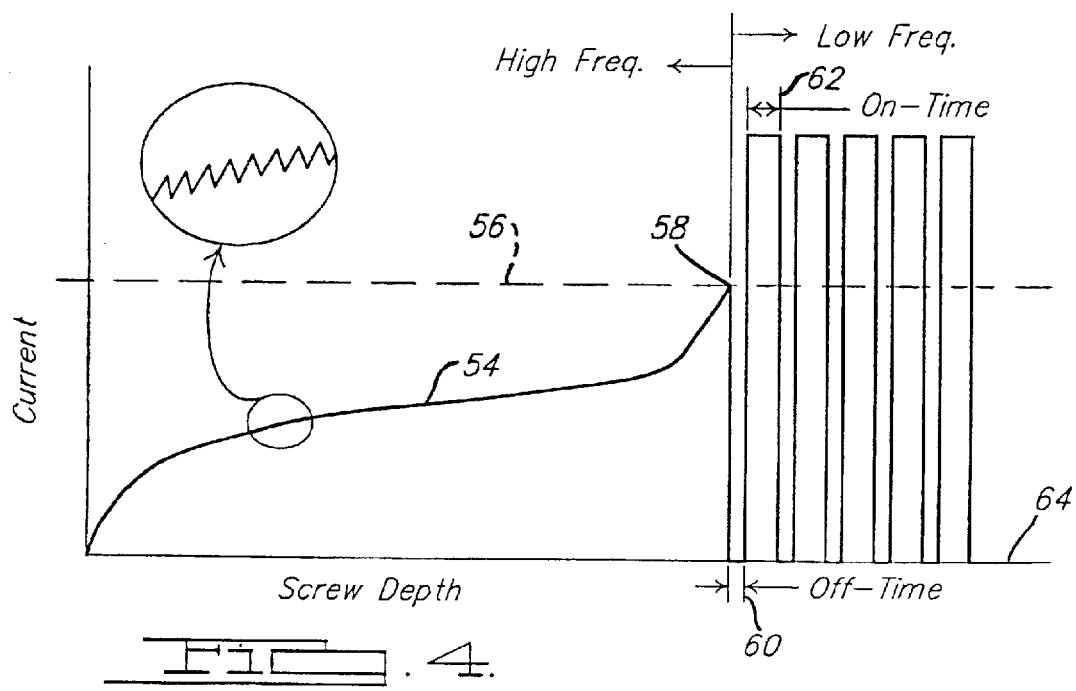
FIG. 4 is a graph of the current flow through the motor verses the depth of a screw being driven in by a power tool incorporating the control circuit of the present invention while a trigger of the power tool is held steady in an engaged position.

Referring to FIG. 4, a graph shows an exemplary current flow through the motor 16 (and thus the torque generated by the motor 16) as regulated by the control circuit 12 when installing a wood screw completely into a piece of wood. Initially, the current flow through the motor 16 is substantially continuous, as represented by curve 54. In actuality, due to the relatively high frequency of the PWM control signal, there exists a corresponding high frequency ripple in the motor current during this mode of operation. When the motor current exceeds the threshold current level 56 set via the current threshold potentiometer 14, which represents the transition point 58, the ratcheting or low frequency mode is initiated. Current flow to the motor 16 is quickly interrupted for the predetermined off-time 60 to allow the gear train 20 in the preferred embodiment to completely relax. After this time interval has expired, the microcomputer 26 causes the MOSFET drive circuit 32 to rapidly apply maximum current flow to the motor 16. This maximum current flow is maintained for the on-time 62 read from the look-up table in the memory 28. The cycle is then repeated until such time as the microcomputer 26 detects that the trigger switch 24 of the drill 10 has been released, as indicated by portion 64 of the waveform.

Importantly, it will be appreciated, for purposes of the scope of the present invention as described herein and as claimed, that it is irrelevant whether the ratcheting mode of operation is initiated by an "off" time period, as shown in FIG. 4, or an "on" time period. Consequently, when the control circuit is described herein as initially interrupting power to the motor in response to the detection of the transition point, it is to be understood that the control circuit could just as readily initially apply full power to the motor in response to the detection of the transition point.

Figure 8:
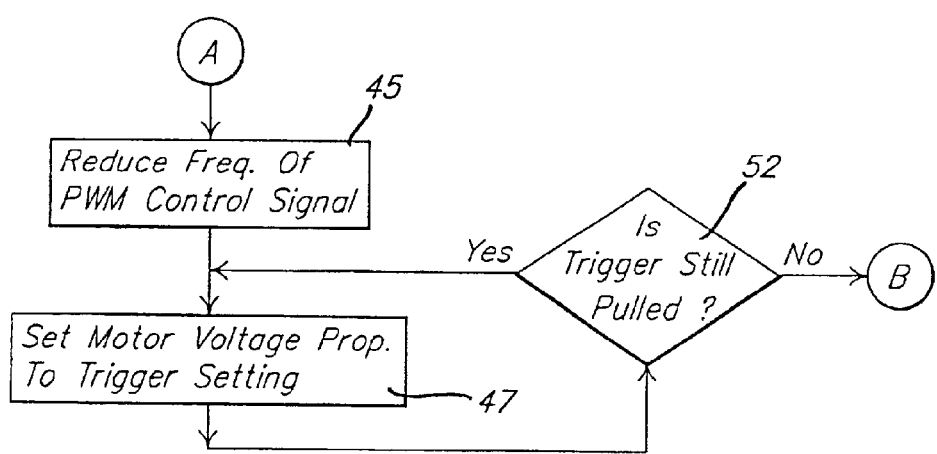
FIG. 8 is a partial flowchart diagram of an alternative manner of controlling the power tool during the ratcheting or low frequency mode of operation illustrated in FIG. 3.

Alternatively, it is readily possible to modify the software algorithm illustrated in FIG. 3 so that the operator of the power tool is able to control the magnitude of the torque bursts during the low frequency or ratcheting mode of operation. In particular, rather than providing fixed on-time and off-time G periods as shown in FIG. 3, the microcomputer 26 can be programmed to merely reduce to a relatively low level the frequency of the PWM control signal and continue to set the motor voltage proportional to the position of the trigger switch. This alternative control scheme is illustrated in FIG. 8. In this embodiment, during the low frequency mode, the percentage on-time of the duty cycle signal, and hence the average motor voltage signal, supplied to the motor is set in accordance with the position of the trigger switch 24. Thus, following detection of the transition point, the microcomputer 26 reduces the frequency of the PWM control signal at step 45 to a predetermined relatively low level, typically between 10–50 Hz. This frequency level is selected to be sufficiently low such that the period of the PWM control signal is substantially greater than the response time of the motor 16. In particular, the period of each cycle of the PWM control signal during the low frequency mode of operation is preferably sufficiently greater than the response time of the motor to enable the output spindle of the power tool to substantially slow down or even stop rotating during the off-time portion of the cycle, which, of course, will be something less than the total time period of each cycle, depending on the position of the trigger switch. In other words, at step 47 the microcomputer is programmed in this embodiment to set the percentage duty cycle of the PWM control signal in accordance with the position of the trigger switch. This will produce corresponding on-time and off-time periods which, added together, equal the period of one cycle of the PWM control signal. Consequently, the duration of the off-time portion of each cycle should be long enough, at least at moderate trigger switch settings, to cause the output torque of the motor to drop below the level necessary to rotationally drive the tool spindle, given the present loading on the tool spindle. In a typical variable speed drill, a frequency of 10–50 Hz has been found to be acceptable, although this too can vary depending upon the characteristics of a particular tool and the application involved.

In this embodiment, therefore, the operator is able to control the magnitude of the torque bursts, and thus control the rate at which a screw is seated into a workpiece, by varying the position of the trigger switch. Accordingly, the operator can, for example, achieve a quarter turn or a half turn of the screw with each torque burst depending upon the position of the trigger switch, and thus properly seat a screw into a workpiece in a very controlled manner. Consequently, the present invention avoids the dilemma of risking the over-application of a large burst of power to finish setting a screw and inadvertently causing the screw to be set too deeply below the surface of the workpiece.

Figure 5:
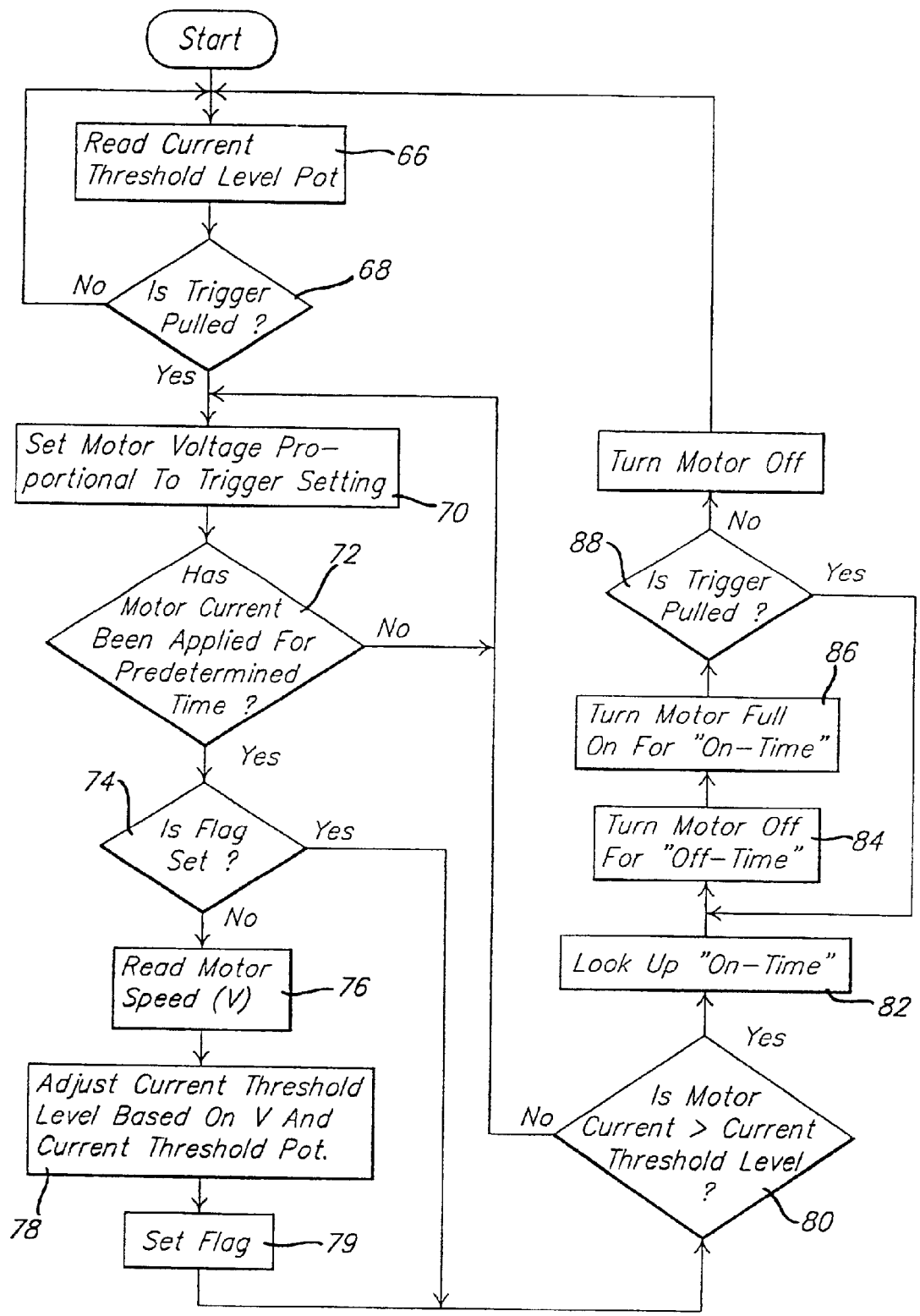
FIG. 5 is a flowchart of an alternative method of control for determining the transition point as to when the ratcheting mode of operation is to begin.
Figure 6:
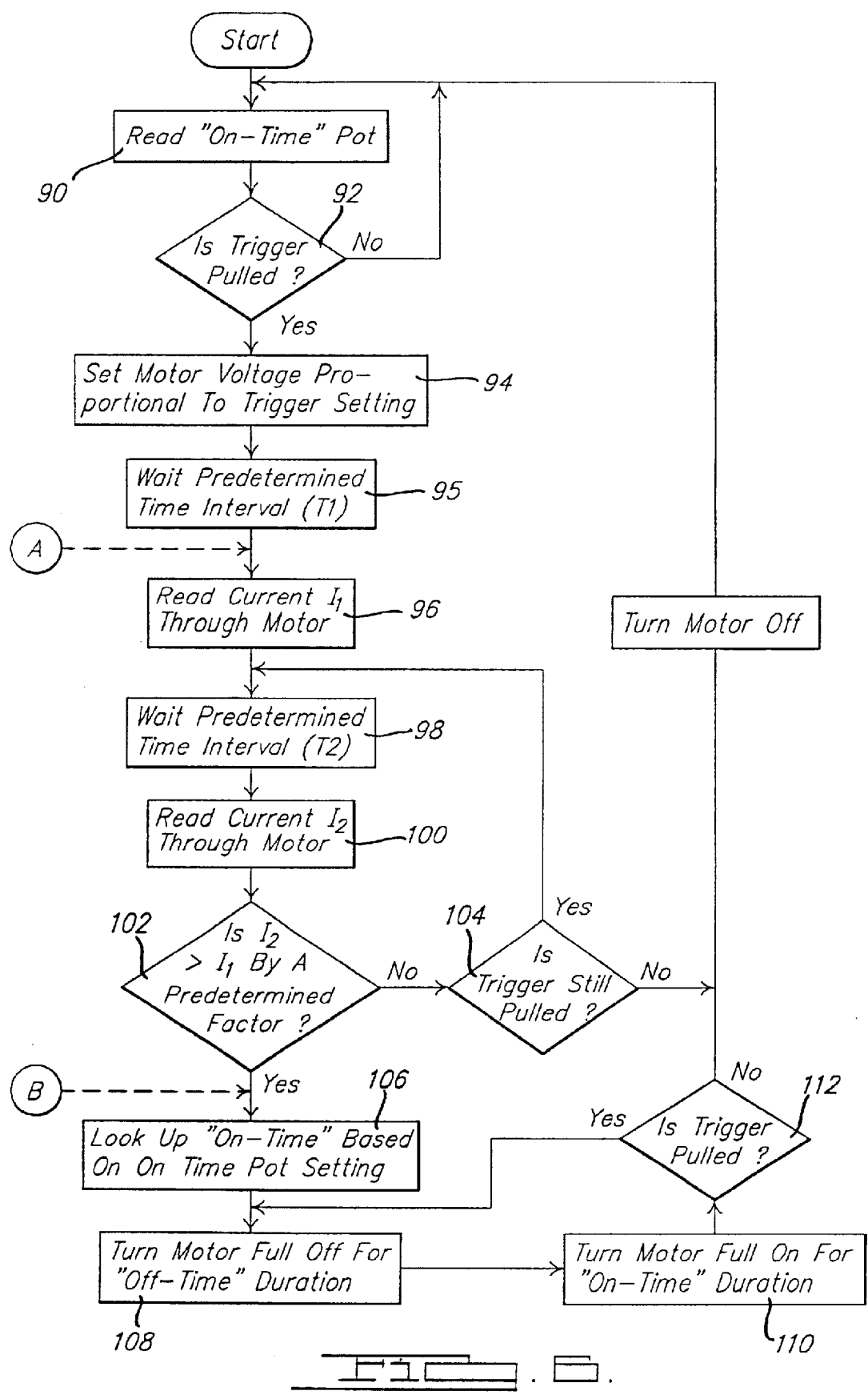
FIG. 6 is a flowchart of another alternative method of control in which the current through the motor of the power tool is measured repeatedly and the ratcheting mode is implemented when the current increases by a predetermined factor from an initial measurement.
Figure 7:
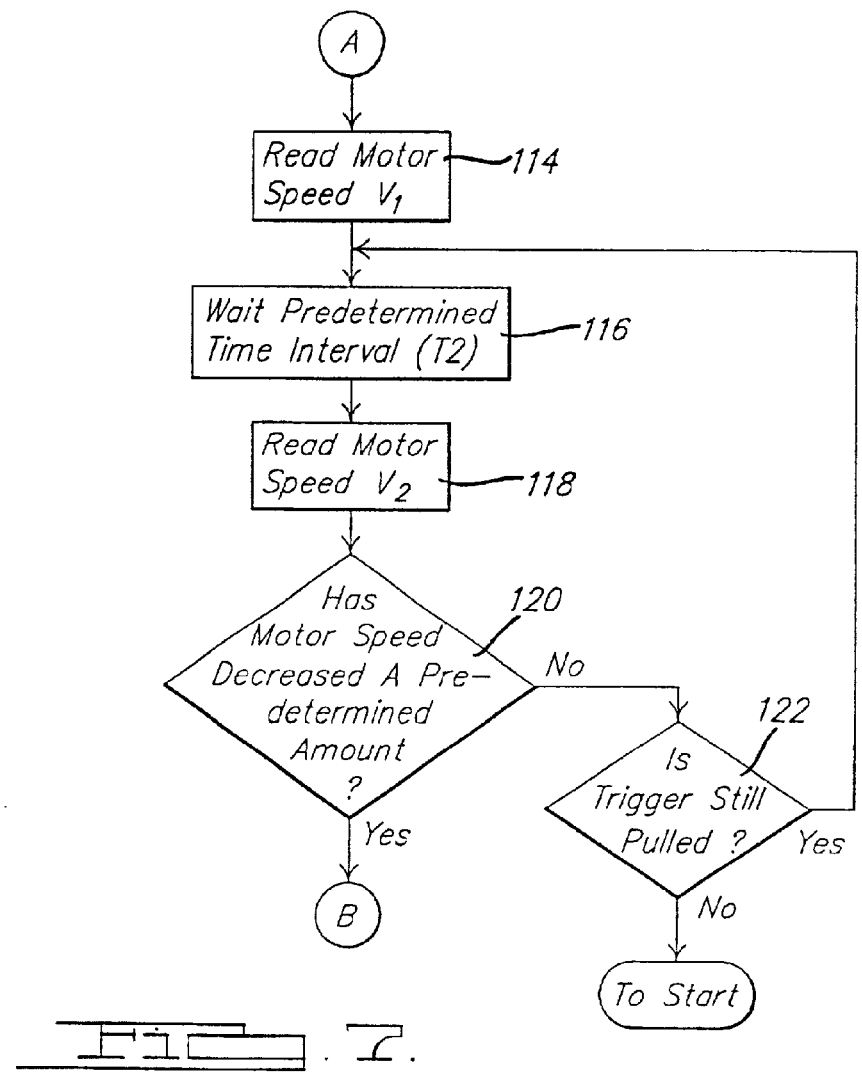
FIG. 7 is a flowchart of another alternative preferred method of control for determining an appropriate transition point by sensing for a predetermined drop in motor speed.

Referring now to FIGS. 5–7, various alternative methods for determining the appropriate time to transition from the high frequency mode to the ratcheting or low frequency mode of operation are disclosed. With initial reference to FIG. 5, the control circuit 12 in this embodiment not only monitors the current flowing through the motor 16 to detect when the transition point has occurred, but also incorporates the use of the speed sensor 36 (shown in FIG. 2) to modify the threshold current level signal provided by the current threshold potentiometer 14 as set by the operator. In particular, the suitability of a particular current threshold is dependent upon the speed of the motor when the threshold is attained. In other words, as motor speed is increased, the amount of inertia in the system increases which will cause a screw to continue to turn after the motor has been turned off. Consequently, in order to provide consistent results, it is preferable to adjust the current threshold in accordance with the speed of the motor at a particular point during the screw setting process that is relatable to the projected speed of the motor when the threshold is attained.

As set forth in the flowchart diagram, the microcomputer 26 initially reads the current threshold potentiometer 14, as indicated at step 66, and waits for the operator to actuate the trigger switch 24, as indicated at step 68. Once the microcomputer 26 detects that the trigger 24 has been pulled, the appropriate motor voltage is set proportional to the trigger setting, as indicated at step 70.

The microcomputer then waits a predetermined time period, as indicated at decision step 72. Once this time period has elapsed, the speed of the motor (V) is read at step 76, and then the current threshold level is adjusted based upon the actual speed of the motor (V) at this point and the setting of the current threshold potentiometer 14, as indicated at step 78. Next, a flag is set (step 79) so that the adjustment process is not repeated (decision step 74) and the program continues in the loop until the motor current exceeds the adjusted current threshold level 80.

If the test at step 80 proves true, then the microcomputer 26 accesses the look-up table in the memory 28 to determine the appropriate on-time, as indicated at step 82, to be applied during the ratcheting mode of operation. The microcomputer 26 then begins the ratcheting mode by turning the motor 16 full-off for the off-time, as indicated at step 84, and then turning the motor 16 full-on for the selected on-time, as indicated at step 86. Another check is then made to determine if the trigger 24 is still being pulled by the operator, as indicated at step 88. If this test proves true, then steps 84, 86, and 88 are repeated until the test at step 88 proves false, whereupon power to the motor is terminated.

The alternative method of control set forth in FIG. 5 thus provides a means by which the transition point can be modified proportionally with differences in motor speed. This allows the control circuit 12 to compensate for the inertia generated at high motor speeds which continues to apply torque to the screw after the motor 16 is turned off. Accordingly, this method can provide even more consistent results in determining the most effective transition point independent of how fast the motor 16 is being operated.

Referring now to FIG. 6, another alternative method of control for determining the appropriate transition point is set forth. This method essentially involves monitoring the current flow through the motor 16 to determine when the current flow has increased by a predetermined factor (for example, doubled or tripled), for signalling the microcomputer 26 to implement the ratcheting mode of operation. With this method of control the optional on-time potentiometer 15 (FIGS. 1 and 2) may be incorporated to provide direct operator control over the on-time interval during the ratcheting mode of operation in lieu of the current threshold potentiometer 14.

Once the operator has actuated the trigger switch (step 92), the on-time potentiometer 15 is read, as indicated at step 90, and the motor voltage is set proportional to the setting of the trigger 24, as indicated at step 94. After a first predetermined time interval (T1), a first current flow reading $I_1$ through the motor 16 is taken, as indicated at step 96. The microcomputer 26 then waits a second predetermined time interval (T2), as indicated at step 98, before taking a second current reading $I_2$ through the motor 16, as indicated at step 100. A test is then made by the microcomputer 26 to determine if $I_2$ is greater than $I_1$ by a predetermined factor, as indicated at step 102. If this test proves false, the microcomputer 26 checks to see if the trigger 24 is still pulled, as indicated at step 104 and, if so, repeats steps 98, 100, and 102 until the test at step 102 proves true.

When the test at step 102 proves true, the microcomputer 26 accesses the memory 28 to obtain the appropriate on-time value from the look-up table, as indicated at step 106. The microcomputer 26 then controls the MOSFET drive circuit 32 to interrupt current flow to the motor 16, as indicated at step 108, thus initiating the ratcheting mode of operation.

The current flow is interrupted for the preset off-time duration, after which a maximum current flow signal is applied to the motor 16 for the selected on-time, as indicated at step 110. The ratcheting mode of operation is repeated until the microcomputer 26 detects that the trigger switch 24 has been released, as indicated at step 112, whereupon the power to the motor is terminated.

The alternative method of control described above in connection with FIG. 6 provides a method for determining the transition point which also "automatically" senses the size of the screw being installed based on the first current reading at step 96. Accordingly, this method has the advantage of automatically tailoring the transition point to occur at an appropriate time to accommodate different size wood screws. As will be readily appreciated by those skilled in the art, the program illustrated in FIG. 6 can also be readily modified to detect a predetermined percentage increase in motor current or a predetermined rate of increase in motor current as the transition event before switching to the ratchet mode of operation.

Yet another alternative method of determining the transition point is shown in connection with FIG. 7. The steps shown in FIG. 7 may be implemented in lieu of steps 96–102 of the method described in connection with FIG. 6. With reference to FIG. 7, after steps 90–95 of FIG. 6 have been performed, the motor 16 speed $V_1$ is read as indicated at step 114. The microcomputer 26 then waits a predetermined time interval (T2), as indicated at step 116, before again reading the motor 16 speed $V_2$, as indicated at step 118. A test is then made to determine if the motor 16 speed has decreased a predetermined amount (for example, by 50 percent), as indicated at step 120. If this test proves false, a check is made to determine if the trigger 24 is still being pulled, as indicated at step 122. If this test proves false, the method loops back to the very start of the program as indicated in FIG. 6.

If the test at step 122 proves true, then steps 116 through 120 are repeated. Once the test at step 120 proves true (i.e., the motor 16 speed has decreased by a predetermined amount) the ratcheting mode of operation is implemented in accordance with steps 106–110 of FIG. 6. Optionally, of course, the test at step 120 could be modified to detect a predetermined percentage drop in motor speed or a predetermined rate of deceleration.

By the method described in connection with FIG. 7, a relatively simple sequence of operation is provided for determining an appropriate transition point at which the ratcheting mode of operation is to occur which also takes into account the size of the wood screw being driven, as well as the hardness of the wood into which the wood screw is being driven. By sensing for a predetermined amount or percentage drop in motor speed, the ratcheting mode can be implemented at appropriate times for a variety of applications to optimize the effectiveness of the tool.

The method of FIG. 7 also does not require the use of the current threshold potentiometer 14. Moreover, the on-time potentiometer 15 is also not required for this preferred method of control.

Figure 9:
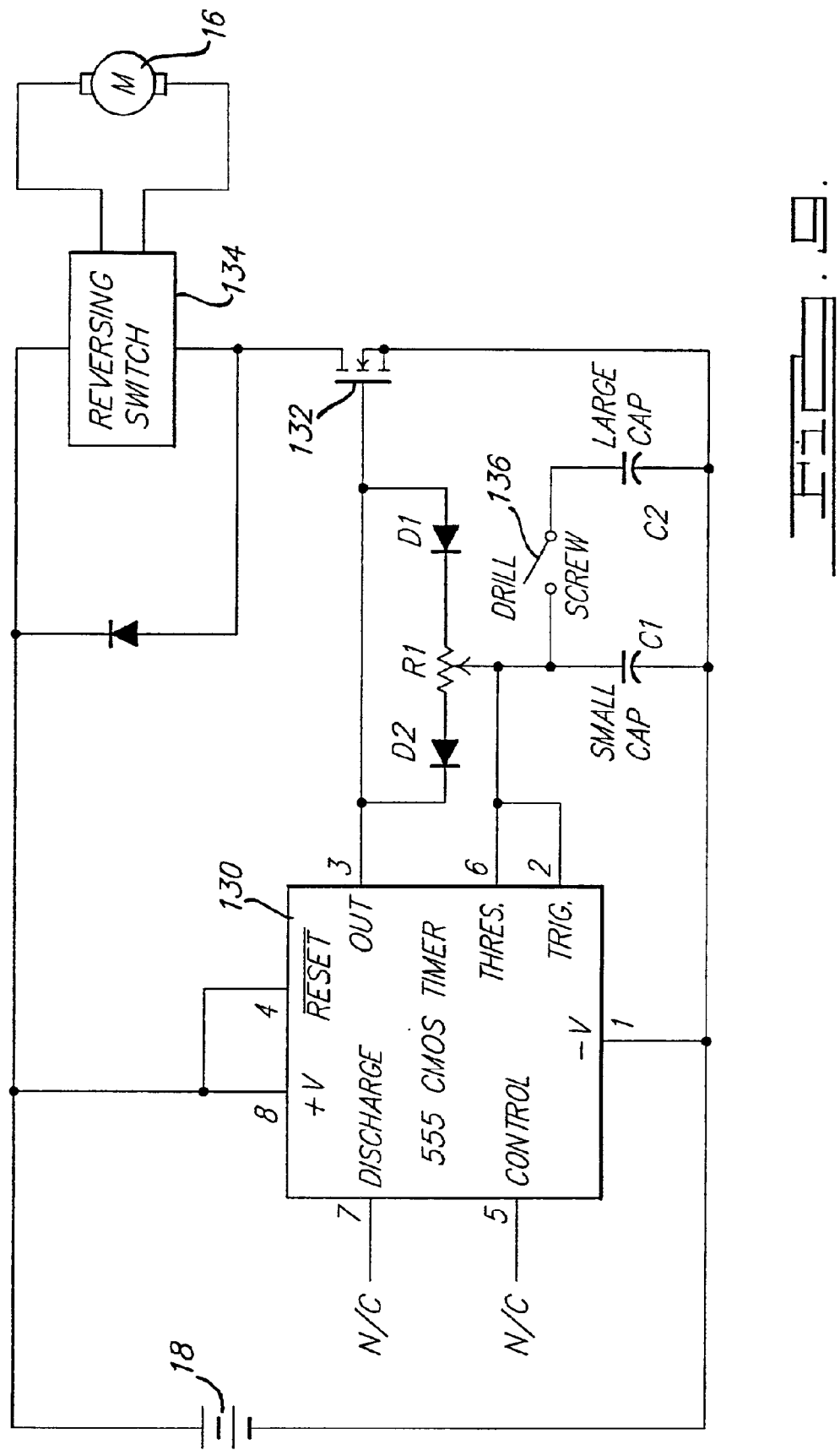
FIG. 9 is a circuit diagram of a simplified version of a motor control circuit incorporating the teachings of the present invention.

Turning now to FIG. 9, a simplified version of a motor control circuit for a power tool according to the present invention is shown. In particular, it has been determined that many of the advantages of the present invention can be achieved with a simplified version of the motor control circuit that does not automatically transition from a conventional high frequency variable speed control mode to a low frequency pulse control mode. Consequently, the feedback circuitry for sensing motor current and speed can be eliminated, and a conventional 555 timer-based controller can be substituted for the more sophisticated and expensive microcomputer-based controller shown in FIG. 2.

In particular, the controller shown in FIG. 9 includes a conventional 555 CMOS timer 130 that is controlled by the charging and discharging cycles of the external RC timing circuit comprised of trigger resister R1 and selectively connected capacitors C1 and/or C2. A user-operated selector switch 136, positioned in a readily accessible location on the tool, is provided to selectively connect the capacitor C2 into or out of the control circuit. The 555 timer circuit 130 is adapted to produce a HI signal at output pin 3 when the signal applied to its TRIGGER input (pin 2) is less than 33% of the supply voltage (V+). A LO output signal is produced at output pin 3 when the signal supplied to the THRESHOLD input (pin 6) is greater than 66% of the supply voltage (V+). When the OUT terminal (pin 3) is HI, the MOSFET 132 is rendered conductive and the motor 16 is energized via the reversing switch 134.

In operation (and assuming for the moment that selector switch 136 is in the open position or "DRILL" mode), capacitor C1 is initially discharged and therefore the output signal at TRIGGER input (pin 2) is less than 33% of battery voltage (+V). Accordingly, output pin 3 is HI, turning on MOSFET 132 and energizing the motor 16. With output (pin 3) HI, capacitor C1 is charged through diode D1 and trigger resistor R1. The rate at which capacitor C1 charges is, of course, determined by the value of capacitor C1 and the setting of trigger switch R1. When capacitor C attains a charge that exceeds 66% of battery voltage (+V), the output (pin 3) will go LO, thereby turning off MOSFET 132 and de-energizing the motor 16. At this point, capacitor C1 will cease charging and begin to discharge through trigger resistor R1, diode D2, and into the OUT terminal (pin 3) of the 555 timer 130 which is now at ground potential. The rate at which capacitor C1 discharges is similarly determined by the value of capacitor C1 and the setting of trigger resistor R1. When the charge on capacitor C1 drops below 33% of battery voltage (+V), the OUT terminal (pin 3) will again go HI repeating the cycle.

Thus, it will be appreciated that the control circuit produces a substantially square wave output signal at OUTPUT pin 3, the duty cycle of which is controlled by the setting of trigger resistor R1. Note, however, that the frequency of the duty cycle signal remains constant as a change in the position of trigger resistor R1 increasing the charge time of the capacitor C1 causes a corresponding decrease in the discharge time of the capacitor C1, and vice versa. In other words, if the duration of the HI signal at pin 3 is increased by a given amount, the duration of the corresponding LO signal is decreased by the same amount. Consequently, the frequency of the output signal, which is determined by the combined period of the HI and LO signals, remains the same.

In the preferred embodiment, the value of capacitor C1 is selected to provide a relatively high duty cycle frequency in the range of 1–12 KHz. Accordingly, when selector switch 136 is in the open position or "DRILL" mode shown, the power tool functions as a conventional variable speed drill. On the other hand, the value of capacitor C2 is preferably selected so that the parallel combination of capacitors C1 and C2 provides a long charge and discharge cycle resulting in a duty cycle frequency in the range of 10–50 Hz. Accordingly, when the selector switch 136 is closed, or in the "screwdriver" mode, the off-time periods at low to moderate trigger settings are sufficiently long to cause a pulsing of the motor 16 under load.

Consequently, the control circuit in FIG. 9 provides the operator with the option of operating the tool in either a conventional drill mode or in a continuous low frequency mode more suitable for controllably driving and setting screws.

Moreover, it will be appreciated that the operation of the present control circuit in the low frequency screwdriver mode is readily compatible with the typical operating technique employed by users of conventional drills when driving screws. Specifically, when using a conventional variable speed drill to drive a screw, the operator will typically drive the screw initially at or near full power and then gradually release the trigger to slow the motor to carefully seat the head of the screw to its proper depth. This same technique is readily usable with the control circuit of the present invention when continuously operated in the low frequency screwdriver mode. In particular, when operated with the trigger at or near its fully retracted position, the high duty cycle setting supplies essentially continuous power to the motor. As a result, the motor rotates smoothly to rapidly drive the screw. Thereafter, as the trigger is released and the duty cycle reduced, the motor begins to ratchet under load, thereby causing incremental rotation of the screw. As previously described, the pulsing action of the motor provides the operator with the ability to more accurately control the final depth to which the screw head is set. Consequently, the operator is not required to learn a new technique in order to effectively use the tool when equipped with the present controller.

Obviously, if it is desired to reduce the cost of the control circuit even further, it is possible to eliminate the selector switch 136 and capacitor C2 and use a single large value capacitor for C1 so that the control circuit always operates in a low frequency mode. Such a control circuit may, for example, be suitable for an inexpensive rechargeable screwdriver.

Figure 12:
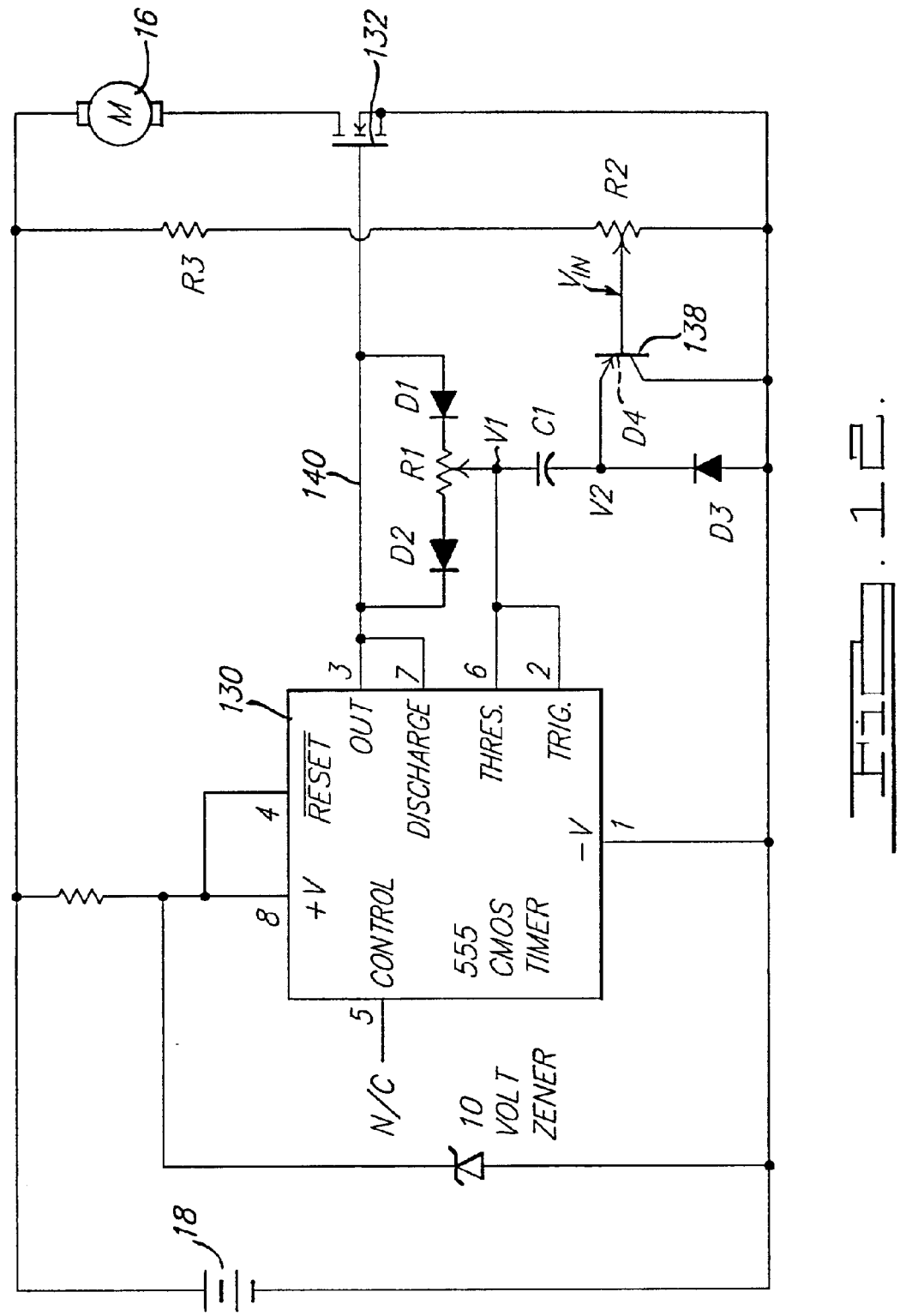
FIG. 12 is an additional alternative embodiment of the simplified version of the present motor control circuit shown in FIG. 9.

Referring now to FIG. 12, a further simplified version of the control circuit according to the present invention is shown. This embodiment of the present controller includes a second variable resistor R2, in addition to the trigger resistor R1, for selectively varying the frequency of the duty cycle control signal within a predetermined range (e.g., 10 Hz–3 KHz). The trigger resistor R1 controls the percentage duty cycle of the output signal from pin 3 that controls the conduction of the FET 132 in the same manner as that described in connection with the embodiment shown in FIG. 9. The values of resistor R3 and variable resistor R2 are selected so that the voltage signal ($V_{in}$) at the wiper terminal of variable resistor R2 can be varied between approximately 0 volts and ⅓(+V) minus 2 diode drops. To understand the manner in which variable resistor R2 controls the frequency of the duty cycle signal at output pin 3, it is helpful to view the base-emitter junction of the transistor 138 as a diode (designated by a phantom line as D4) with its cathode connected to the ($V_{IN}$) signal at the wiper of variable resistor R2.

Figure 13A:
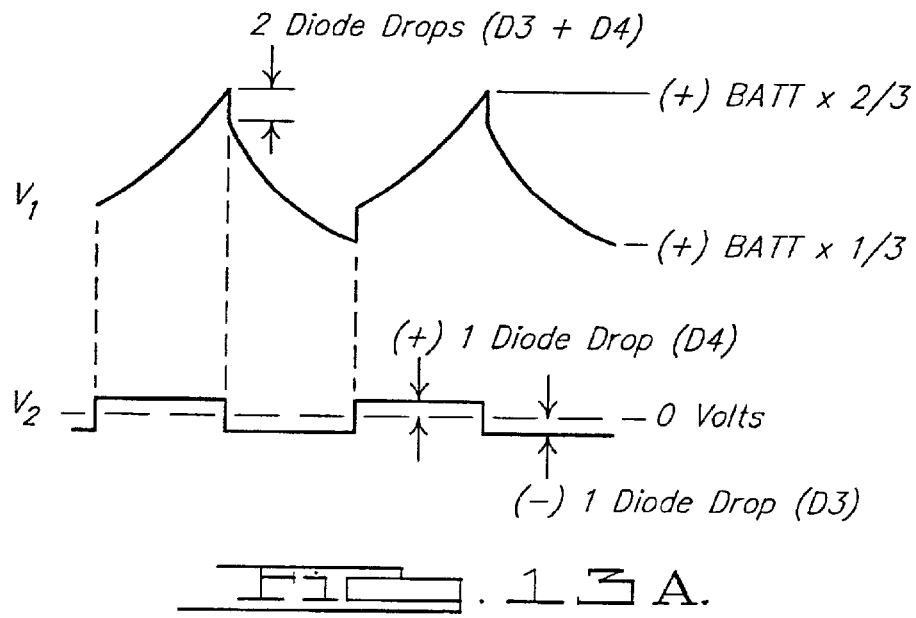
FIGS. 13a and 13b are timing diagrams illustrating the operation of the motor control circuit shown in FIG. 12.
Figure 13B:
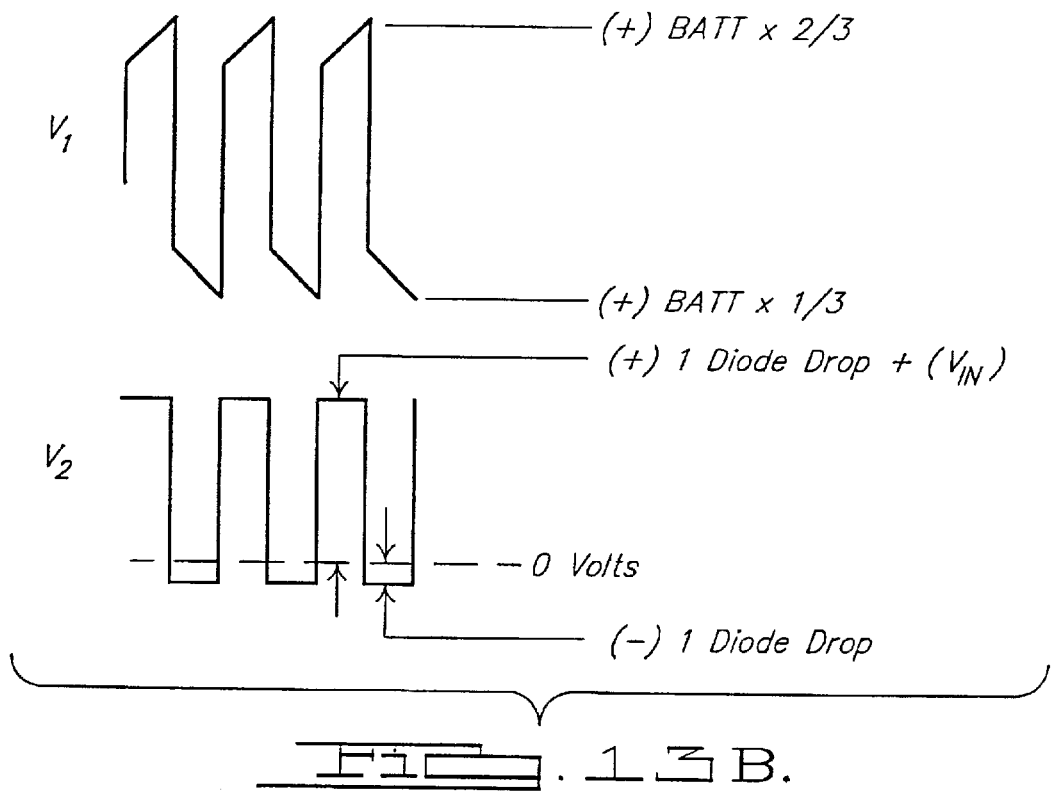

With additional reference to FIGS. 13a and 13b, when $V_{in}$ is approximately equal to 0 volts, the signal at $V_2$ switches between a diode drop above and a diode drop below 0 volts as the duty cycle control signal on output line 140 cycles on and off. Consequently, there is little effect on the charge and discharge periods of capacitor C1 and the frequency of the duty cycle signal is approximately equal to 0.7/(R1×C1). (FIG. 13a). However, when the $V_{in}$ signal is increased to approximately its maximum value of ⅓(+V) minus 2 diode drops, the signal at $V_2$ now switches between $V_{in}(+)1$ diode drop to (−)1 diode drop. Thus, since the switching thresholds of the 555 timer 130 are ⅓(+V) and ⅔(+V), the capacitor C1 need only charge and discharge by a very small amount to cycle between the ⅓(+V) and ⅔(+V) thresholds. As a result, the charge on the capacitor C1 cycles between the two switching thresholds at a significantly faster rate, thereby increasing the frequency of the duty cycle control signal on line 140 accordingly. In short, the frequency control resistor R2 permits the operator to vary the frequency of the PWM control signal between a predefined low frequency (e.g., 10 Hz), determined by the values of R1 and C1, and a very high frequency (e.g., 500 KHz) essentially limited by the maximum switching frequency of the 555 timer 130. In the preferred embodiment, however, the value of resistor R3 is selected so as to limit the maximum frequency of the PWM control signal to approximately 3 KHz.

Thus, it will be appreciated that the embodiment illustrated in FIG. 12 provides the operator with enhanced flexibility at a modest incremental cost. For example, to operate the tool in a conventional drill mode, the frequency knob R2 is adjusted to its highest frequency setting. Alternatively, to provide the most effective ratcheting mode, such as may be needed to set very large screws, the frequency knob R2 is adjusted to its lowest frequency setting. In addition, the operator has the option of selectively setting the frequency knob R2 to any position in between suitable, for example, to setting smaller screws, or for providing a combination of conventional and pulse control with changes in the duty cycle of the control signal as described above.

With all of the embodiments described herein, it will be appreciated that the ratcheting or low frequency mode of operation could easily be employed, with little or no modification, to break loose tightly seated wood screws, nuts, etc. where the continuous application of torque proves ineffective. It will also be appreciated that the ratcheting or low frequency mode of operation disclosed herein could also be adapted with little or no modification for a variety of power tools including, but not limited to, power rivet tools, for example, to improve the effectiveness of such tools.

Finally, it has been demonstrated that the present invention can be implemented in various simplified forms that are producible at very low cost and yet significantly improve the performance and effectiveness of the power tool to which it is applied.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A power tool having an electric motor, having associated therewith a response time, for driving an output spindle having a tool holder operatively coupled thereto, an operator actuable switch for controlling the amount of power applied to the motor, and a control circuit for modulating the power supplied to the motor in accordance with the position of said switch by varying the duty cycle of a constant frequency, pulse width modulated (PWM) direct current (d.c.) control signal generated by the control circuit to thereby control the speed of the motor; the improvement wherein the period of the PWM d.c. control signal generated by said control circuit is greater than the response time of the motor.

2. A power tool having an electric motor for driving an output spindle having a tool holder operatively coupled thereto, an operator actuable switch for controlling the amount of power applied to the motor, and a control circuit for modulating the power supplied to the motor in accordance with the position of said switch by varying the duty cycle of a constant frequency, pulse width modulated (PWM) direct current (d.c.) control signal generated by the control circuit to thereby control the speed of the motor; the improvement wherein said control circuit generates said PWM d.c. control signal at a frequency that is sufficiently low to cause said motor to provide, over a substantial portion of the duty cycle range of said control signal, bursts of torque to said output spindle that cause substantial variation in the speed of rotation of said output spindle between successive bursts of torque.

3. The power tool of claim 2 wherein said frequency is within a range between 10 Hz and 50 Hz.

4. The power tool of claim 2 further including a second operator actuable device for selectively setting the frequency of said PWM control signal.

5. The power tool of claim 4 wherein said second operator actuable device comprises a second switch for selectively setting the frequency of said PWM control signal to either a first high frequency greater than 1 KHz or a second low frequency less than 50 Hz.

6. The power tool of claim 4 wherein said second operator actuable device is adapted to selectively vary the frequency of said PWM control signal within a range that includes 10 Hz–50 Hz.

* * * * *

UNITED STATES PATENT AND TRADEMARK OFFICE
CERTIFICATE OF CORRECTION

PATENT NO. : 6,836,614 B2
DATED : December 28, 2004
INVENTOR(S) : Alan A. Gilmore It is certified that error appears in the above-identified patent and that said Letters Patent is hereby corrected as shown below:

Title page,
Item [*] Notice, insert the following -- This patent is subject to a terminal disclaimer. --

Column 18,
Line 16, after "range" insert -- of --.

Signed and Sealed this

Tenth Day of May, 2005

JON W. DUDAS
*Director of the United States Patent and Trademark Office*